Aug. 9, 1955　　　A. B. MACHADO　　　2,714,990
OPERATION TERMINATING MECHANISM
Original Filed Jan. 25, 1951　　　14 Sheets-Sheet 5
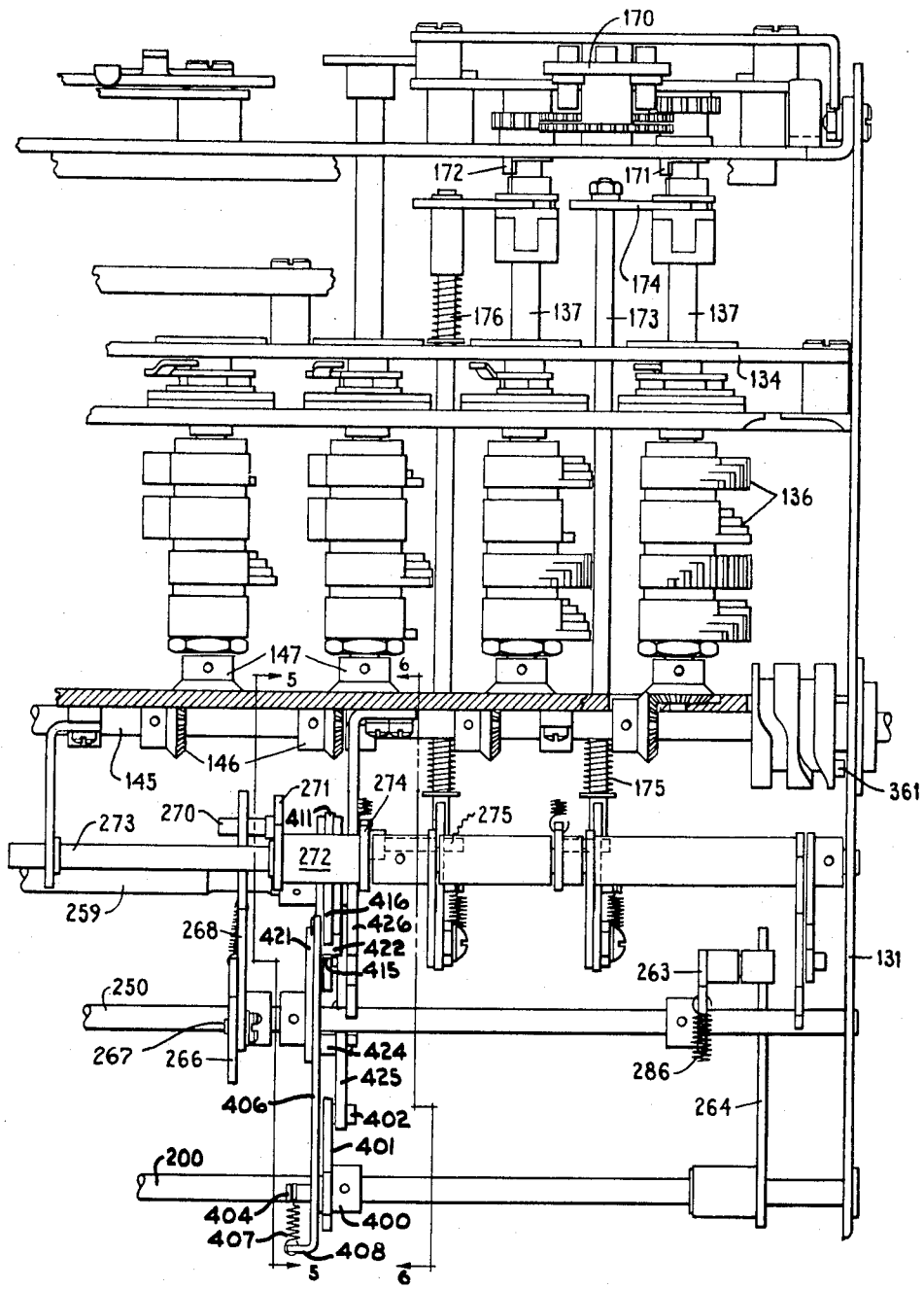
FIG_3B
INVENTOR.
ANTHONY B. MACHADO
BY Donald M. Wight
ATTORNEY

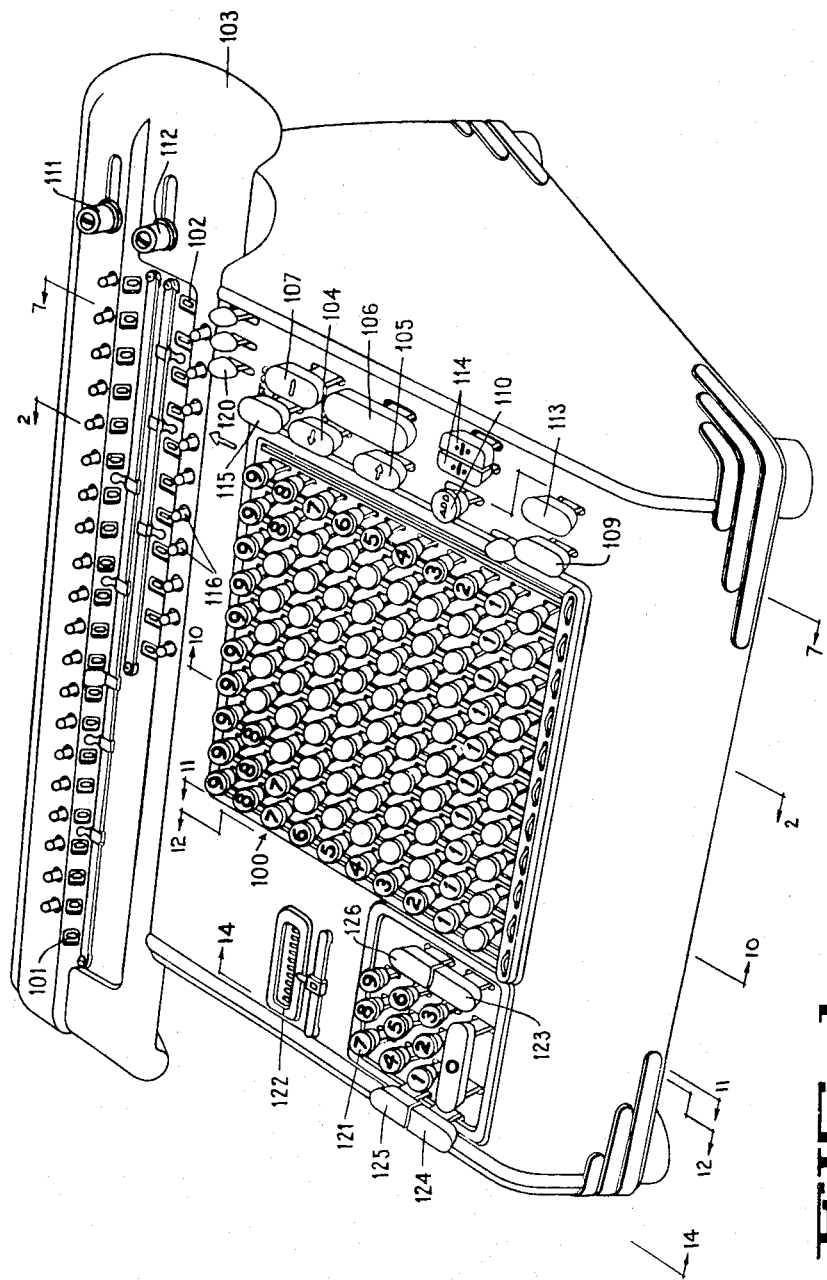

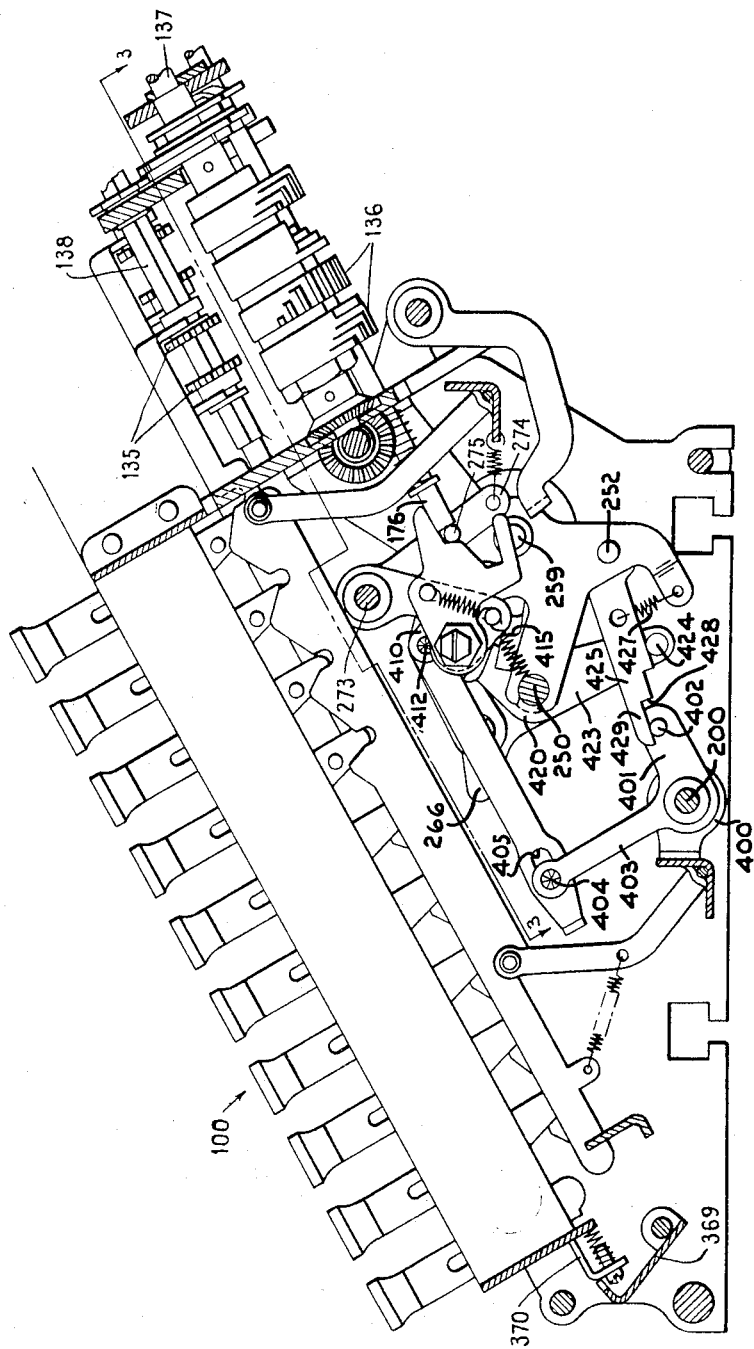

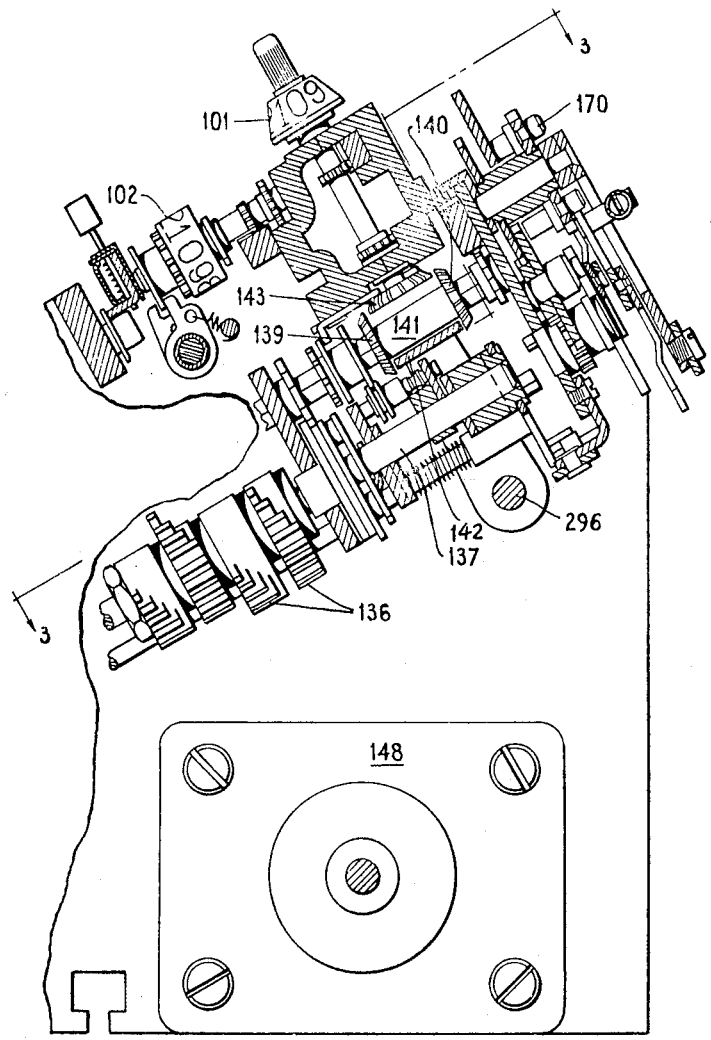
FIG_2b

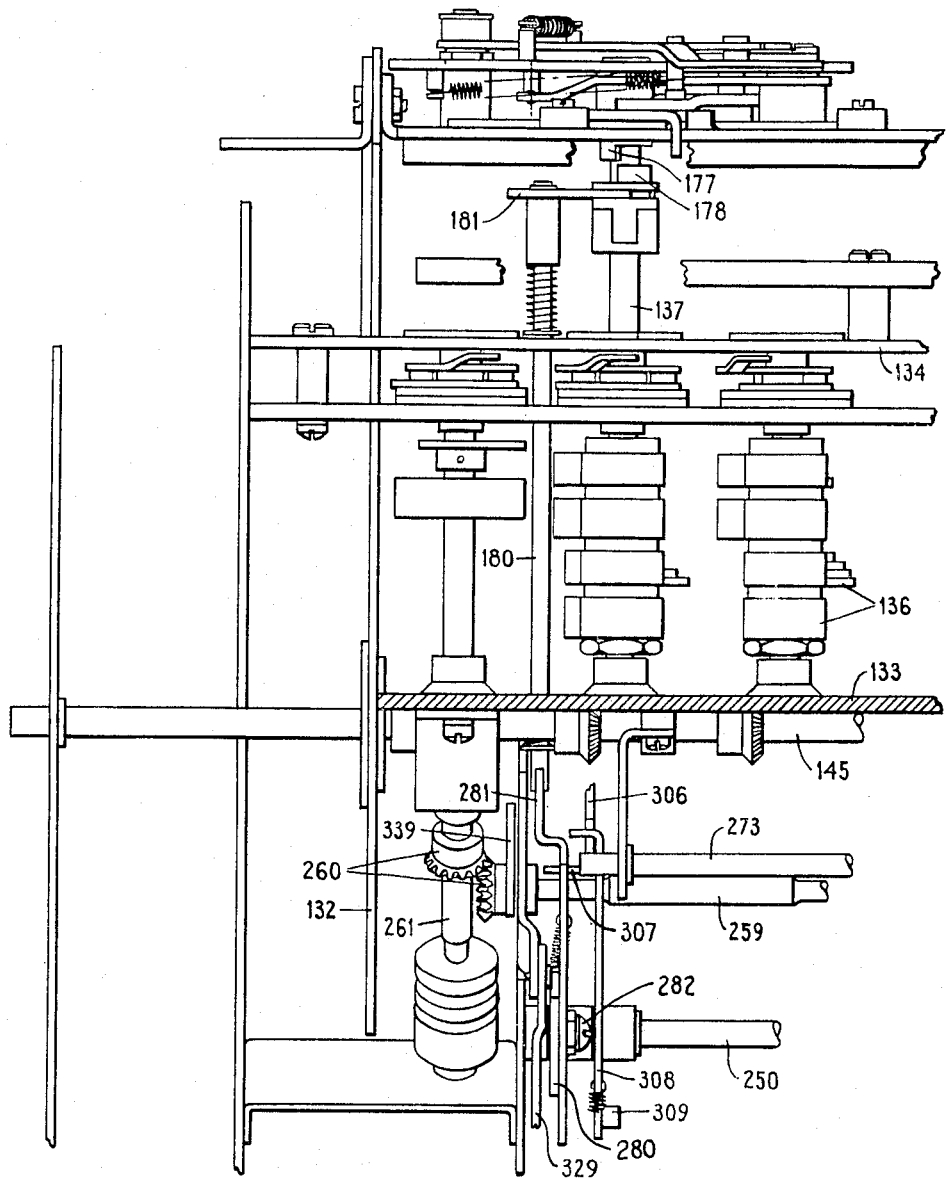
FIG_3A

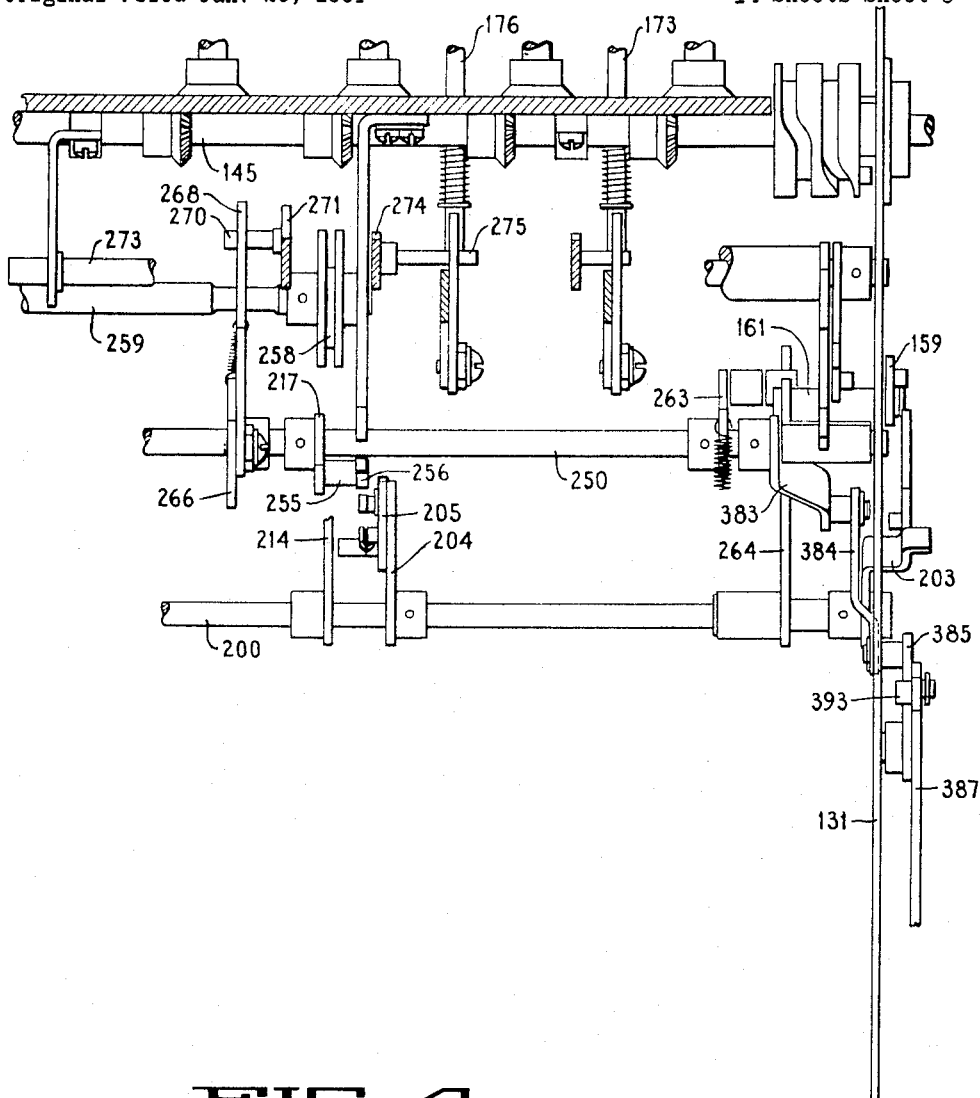
FIG_4

Aug. 9, 1955  A. B. MACHADO  2,714,990
OPERATION TERMINATING MECHANISM
Original Filed Jan. 25, 1951  14 Sheets-Sheet 7
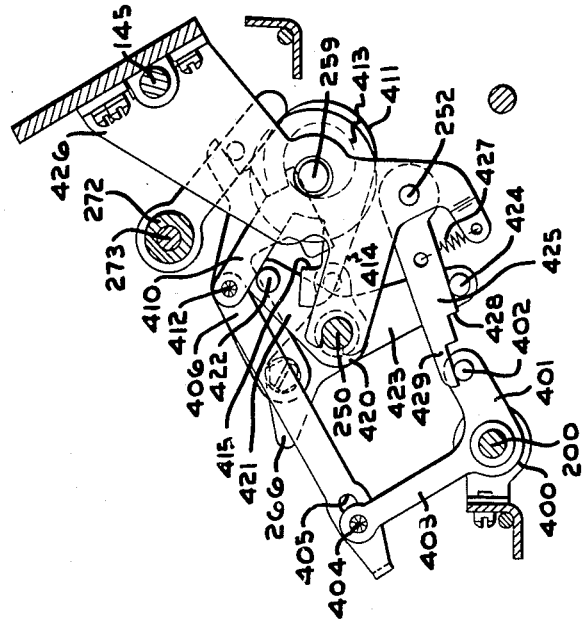
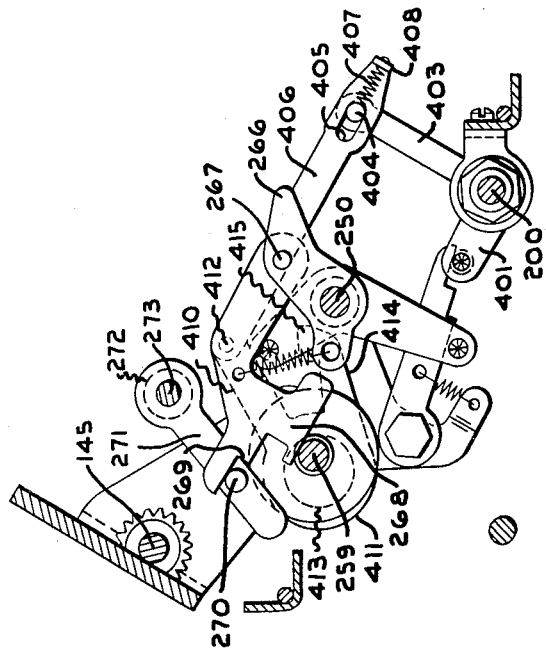
INVENTOR.
ANTHONY B. MACHADO
BY Donald M. Wight
ATTORNEY

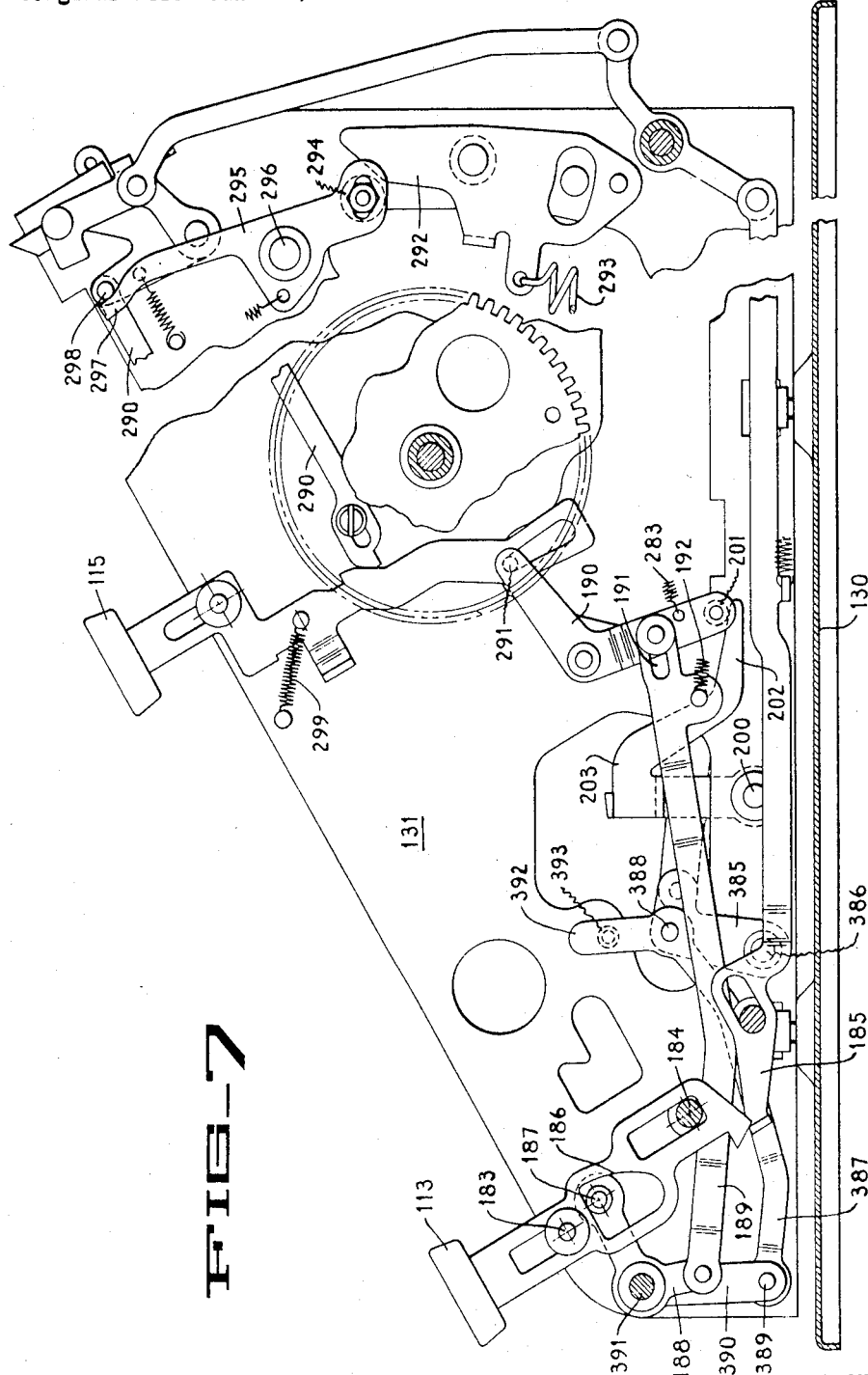

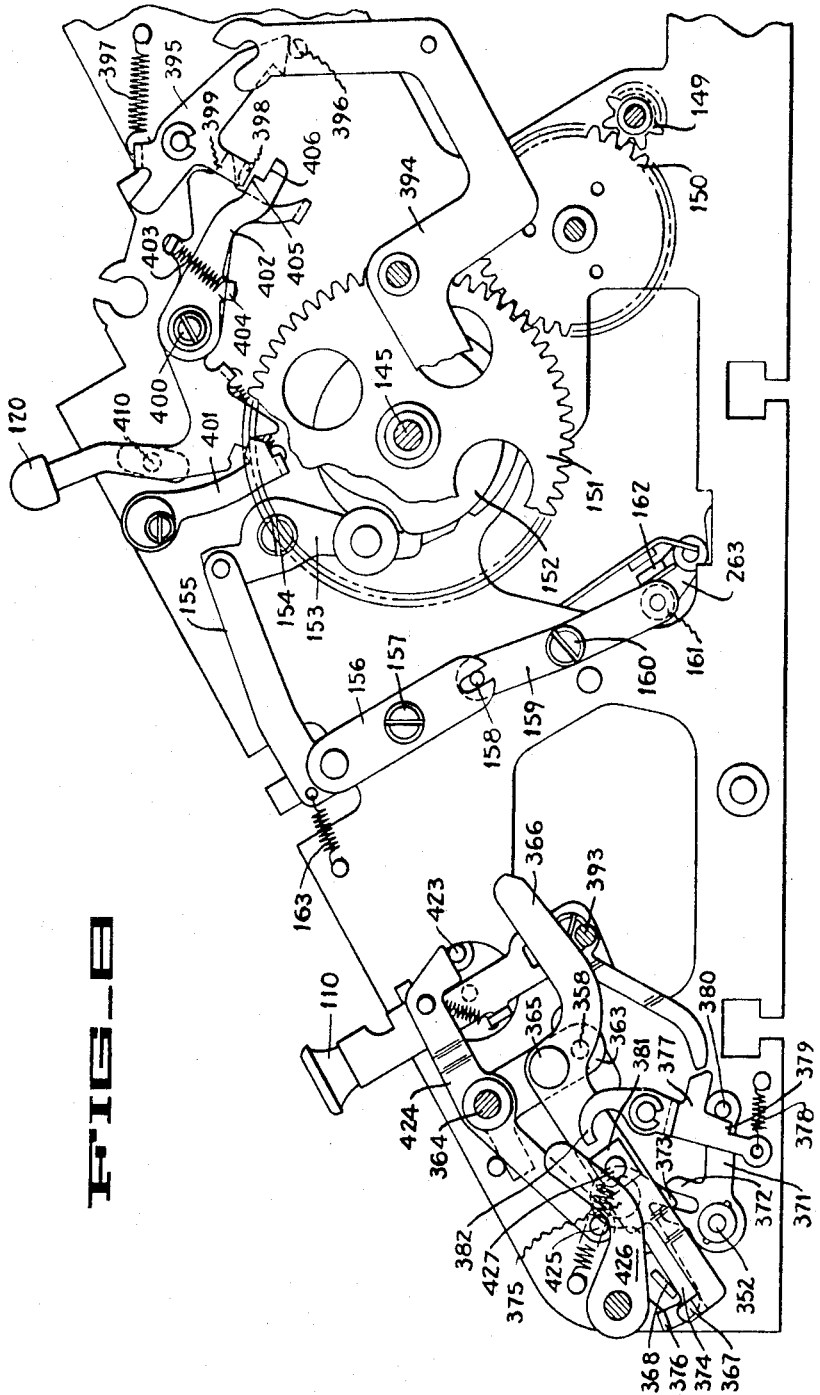

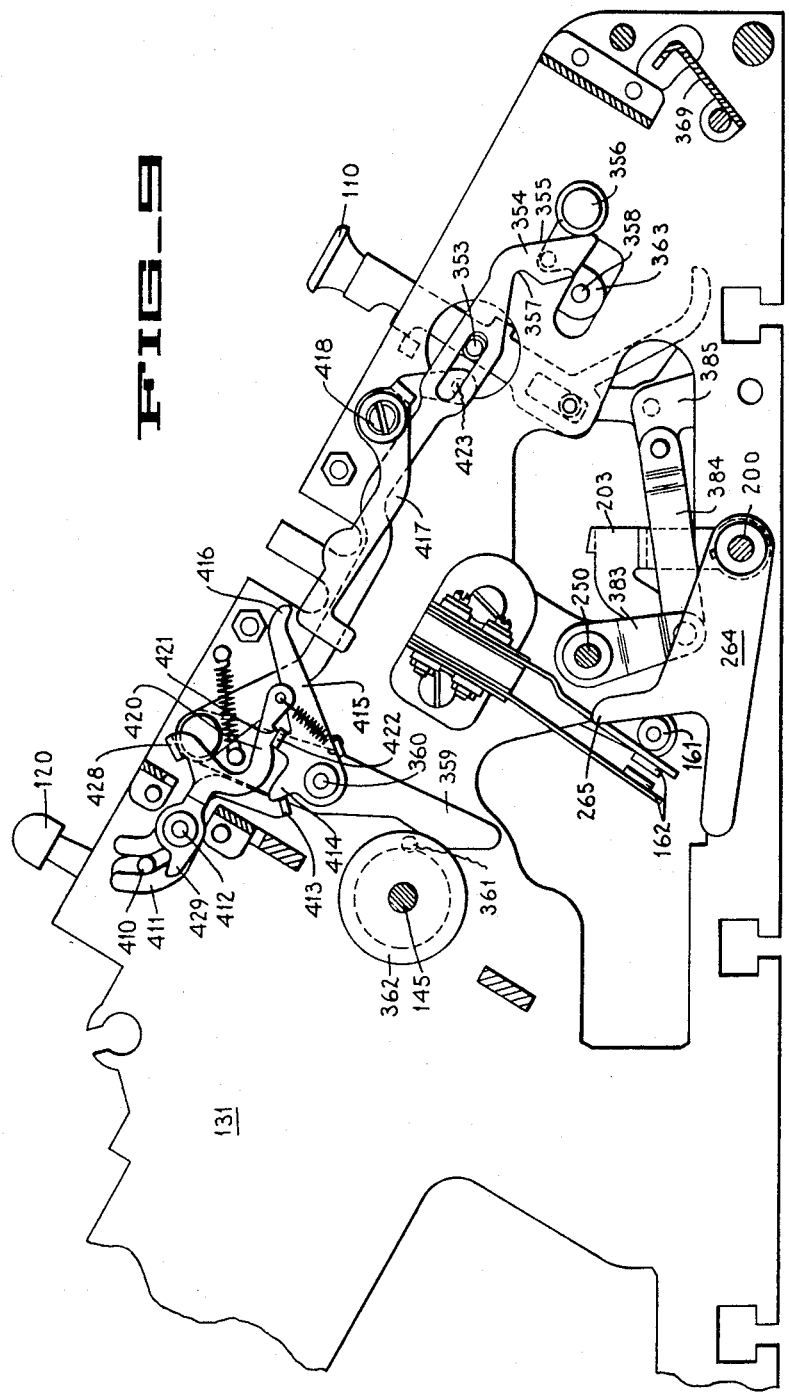

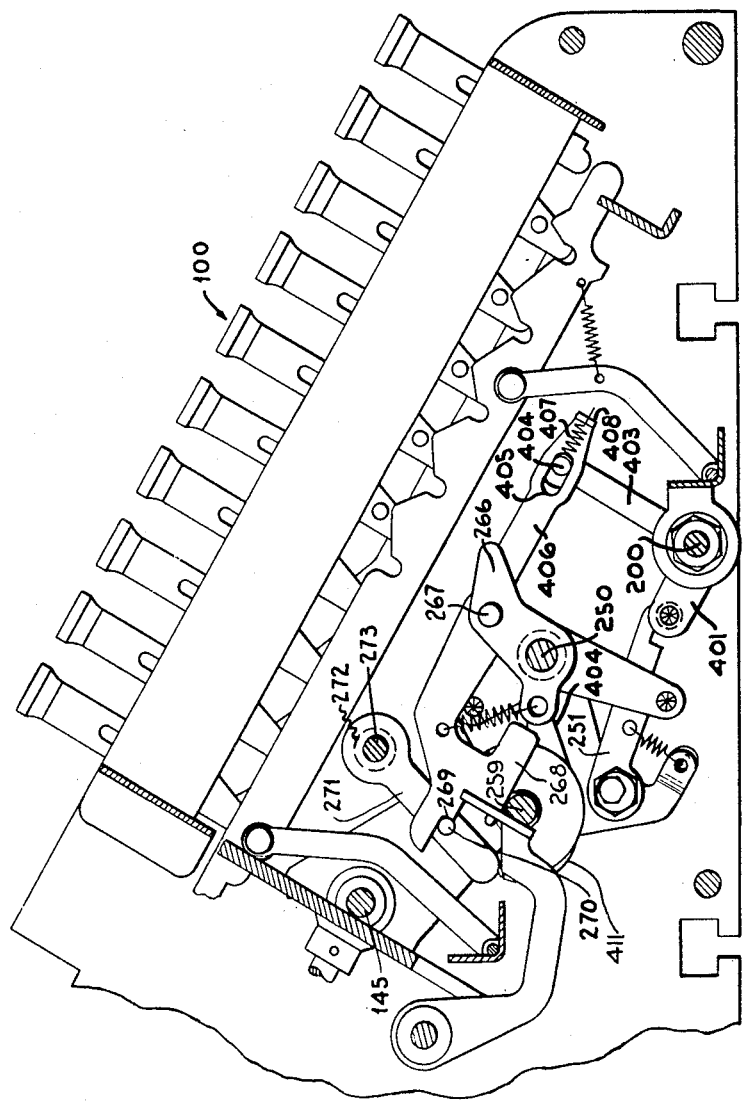

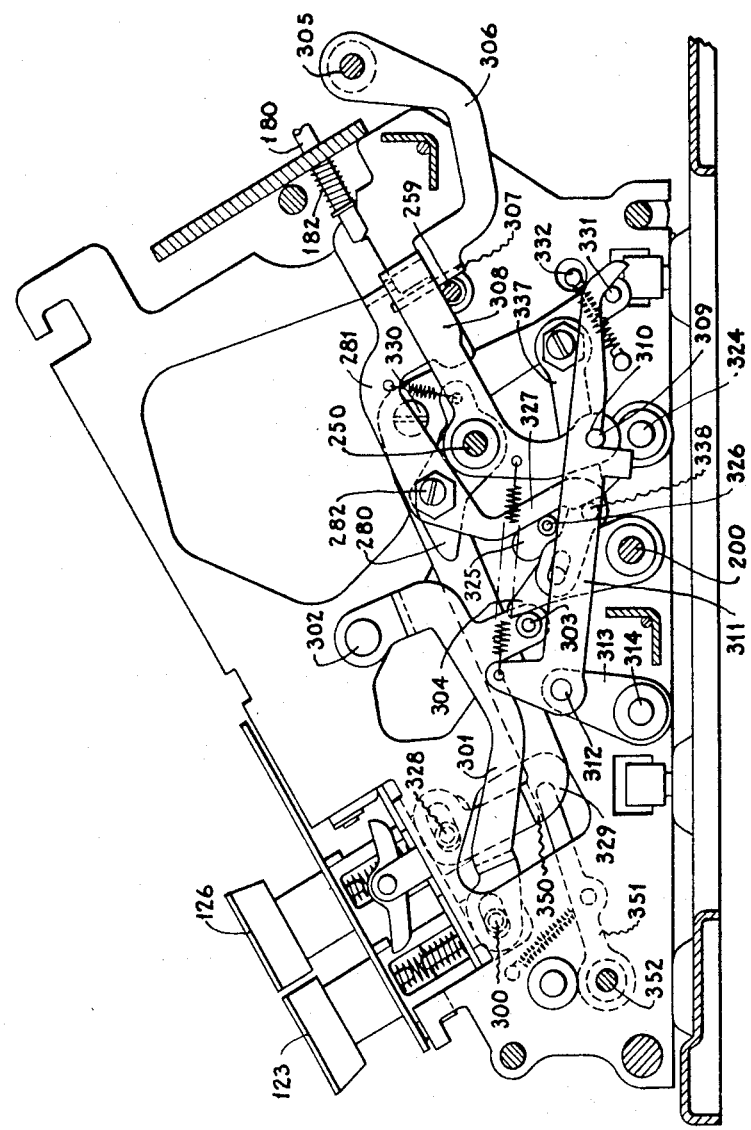

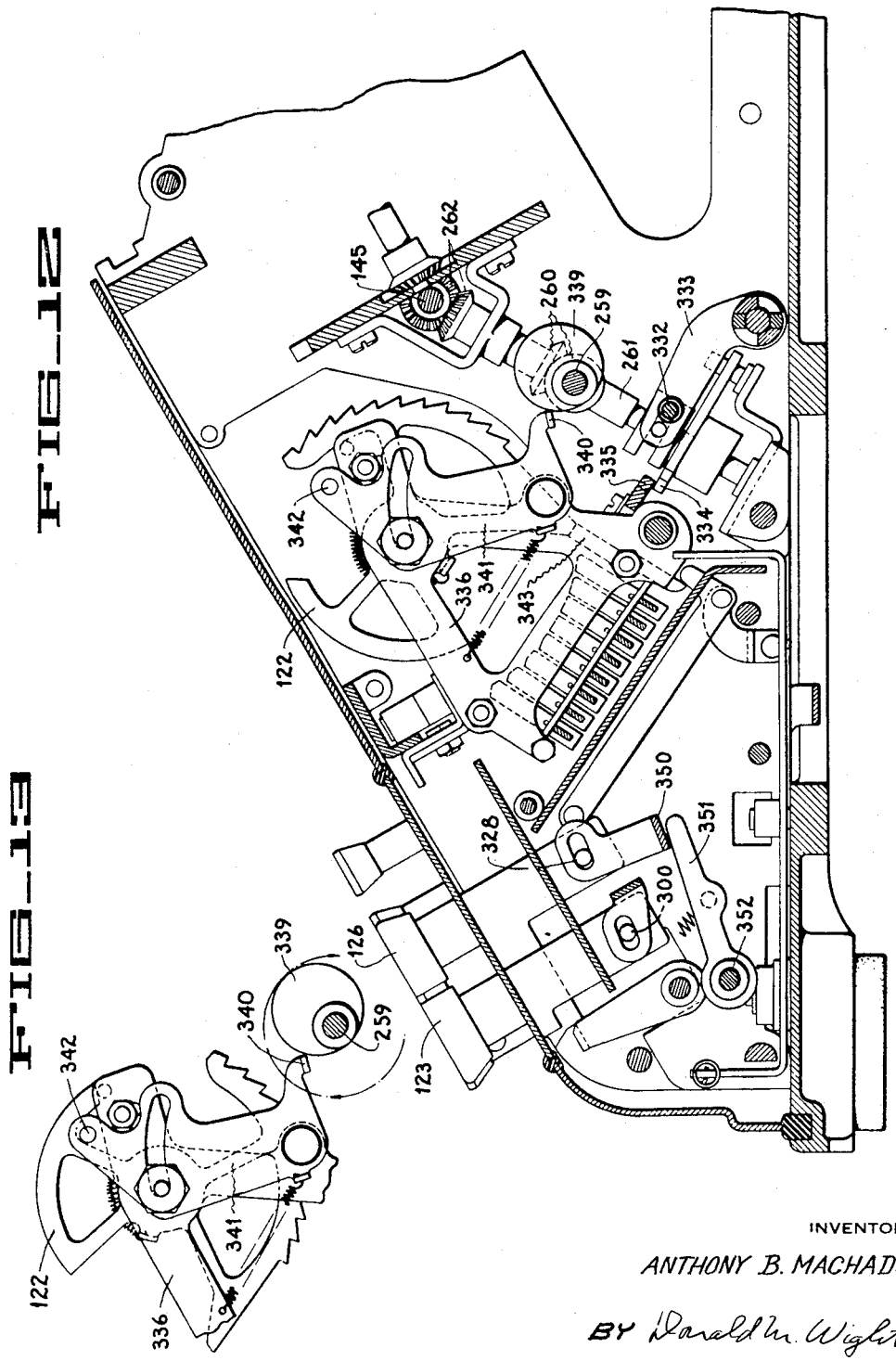
Aug. 9, 1955   A. B. MACHADO   2,714,990
OPERATION TERMINATING MECHANISM
Original Filed Jan. 25, 1951   14 Sheets-Sheet 13
INVENTOR
ANTHONY B. MACHADO
BY Donald M. Wight
ATTORNEY

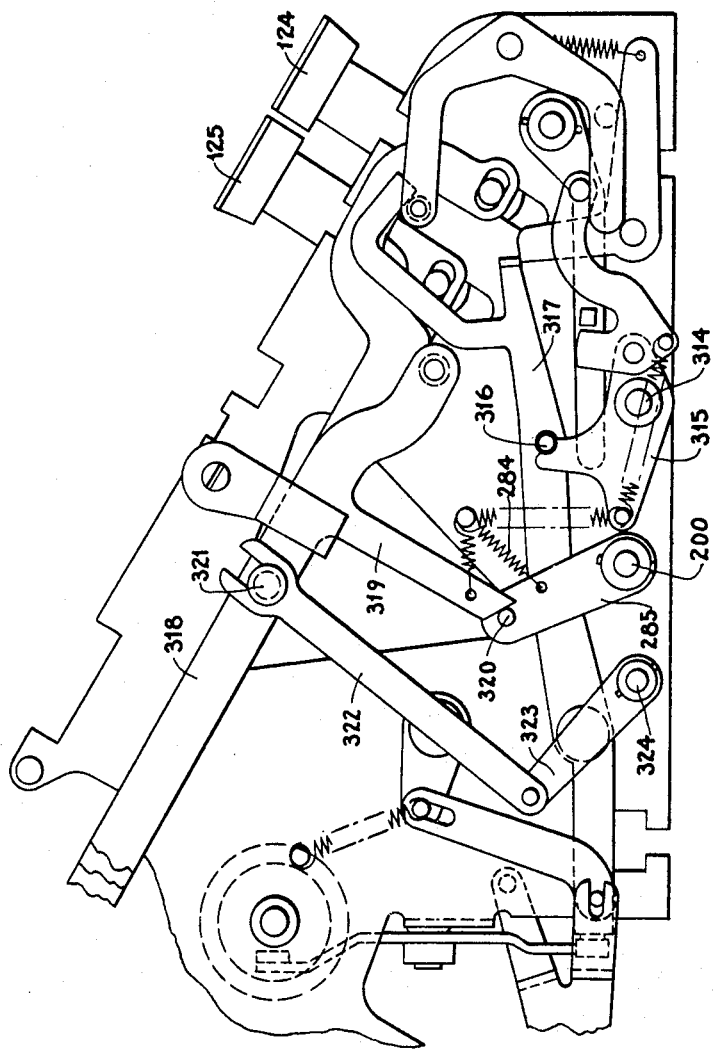

United States Patent Office

2,714,990
Patented Aug. 9, 1955

2,714,990

OPERATION TERMINATING MECHANISM

Anthony B. Machado, San Leandro, Calif., assignor to Friden Calculating Machine Co., Inc., a corporation of California Continuation of application Serial No. 207,782, January 25, 1951, which was a continuation-in-part of application Serial No. 2,663, January 16, 1948, in turn a division of application Serial No. 666,966, May 3, 1946. This application October 15, 1951, Serial No. 251,311

13 Claims. (Cl. 235—73)

This invention relates to calculating machines and particularly machines which are adapted to perform addition, subtraction, multiplication and division. This application is a continuation of my application filed January 25, 1951, entitled Calculating Machines, S. N. 207,782, abandoned subsequent to the filing hereof, which application was a continuation-in-part of application S. N. 2,663, filed January 16, 1948, now abandoned, which was a division of application S. N. 666,966, filed May 3, 1946, which application was abandoned in favor of continuation-in-part application S. N. 164,765, filed May 27, 1950, now Patent No. 2,650,761.

For purposes of disclosure the invention will be shown embodied in a machine of the type disclosed in the following patents: Patent No. 2,229,890, issued to Carl M. F. Friden on January 28, 1941, for Automatic Division; Patent No. 2,363,737, issued to Anthony B. Machado on November 28, 1944, for Dividend Entry and Return Clear; Patent No. 2,371,752, issued to Carl M. Friden on March 20, 1945, for Automatic Multiplication; Patent No. 2,399,917, issued to Carl M. Friden and Anthony B. Machado on May 7, 1946, for Improved Automatic Multiplication; Patent No. 2,427,271 of Carl M. Friden and Anthony B. Machado, dated September 9, 1947, for Rapid Correction.

Parts of the mechanism disclosed in the above patents associated with the mechanism of this invention are disclosed herein in order to show the environment of the novel structure. For a full disclosure of any of these mechanisms reference is to be had to the patents cited.

OBJECTS

An object of the invention is to provide an improved mechanism for correlatively controlling a division stopping apparatus and a keyboard clearing apparatus.

Another object of the invention is to provide a calculating machine capable of automatically performing division operations comprising a control member actuatable for stopping a division operation selectively in a current cycle, or after a true quotient has been registered, and mechanism controlled by the member for preventing clearing of the machine keyboard when the division operation is stopped by actuation of the control member.

Other objects will be evident after the following disclosure in which:

Fig. 1 is a perspective view of the machine in which the invention is embodied.

Figs. 2A and 2B taken together comprise a vertical longitudinal section thru the machine, the plane of the section is indicated by the line 2—2 in Fig. 1.

Figs. 3A and 3B taken together constitute a transverse section taken as indicated by the line 3—3 in Figs. 2A and 2B.

Fig. 4 is a view similar to Fig. 3B in which certain parts have been omitted and other parts have been added.

Fig. 5 is a fragmentary sectional view showing the power setting unit, the location of the section being indicated by the lines 5—5 in Fig. 3B.

Fig. 6 is a view taken on the other side of the unit, the location of the section being indicated by the line 6—6 in Fig. 3B.

Fig. 7 is a sectional view with parts omitted to show mechanism associated with the dividend entry and the return clear key, the location of the section being indicated on line 7—7 in Fig. 1.

Fig. 8 is a section similar to that in Fig. 7 but with certain parts omitted and others added for the sake of clarity.

Fig. 9 is a view taken from the other side of the frame on which the parts of Fig. 8 are mounted.

Fig. 10 is a fragmentary longitudinal section taken as indicated by the line 10—10 in Fig. 1.

Fig. 11 is a vertical section taken as indicated by the line 11—11 in Fig. 1.

Fig. 12 is a vertical section taken as indicated by the line 12—12 in Fig. 1.

Fig. 13 is a fragmentary view of certain parts shown in Fig. 12 in a different position.

Fig. 14 is a vertical section taken as indicated by the line 14—14 in Fig. 1.

GENERAL DESCRIPTION

Referring to Figure 1, the machine is provided with a main keyboard 100 in which the operator sets the values which are to be registered in the accumulator 101. The number of registrations is counted in the revolutions counter 102. Both the accumulator 101 and the counter 102 are disposed in a shiftable carriage 103. Shifting of the carriage is controlled by manipulation of left and right shift keys 104, 105, respectively. Positive and negative registration of the values set in the keyboard 100 is controlled by plus and minus keys 106, 107.

Keyboard 100 may be manually corrected by depression of keyboard clear key 109. Add key 110 when preset in a depressed position causes the key board 100 to be automatically cleared at the conclusion of an operation. Values registered in the accumulator 101 may be manually cleared therefrom by means of knob 111, and values registered in the counter 102 may be manually cleared therefrom by means of knob 112. An automatic return clear operation can be initiated by depressing return clear key 113 which causes the carriage to be shifted by power to the left-end position where the accumulator and counter clear mechanisms may be automatically operated.

Automatic division operation may be initiated by depressing control keys 114. For a full disclosure of the mechanism controlled by the automatic division key reference is to be had to the patent to Friden No. 2,229,890. To facilitate the performance of a division operation a dividend entry key 115 is provided and also tabulator keys 116 on the carriage 103. When it is desired to enter the dividend in a predetermined ordinal position of the carriage the appropriate tabulator key 116 is depressed, then the operator sets the dividend value in the keyboard 100 and depresses the dividend entry key 115 which initiates an automatic operation which comprises first, a return clear operation followed by a right shift to the position determined by the depressed tabulator key 116 where the dividend value set in the keyboard 100 is automatically entered in the accumulator 101. For a full disclosure of this mechanism reference is to be had to the patent to Machado 2,363,737 referred to above.

In the performance of division operations it is often desirable to terminate the operation before the carriage 103 reaches the left-end position. This may be because the operator notices that he has obtained sufficient figures in the counter 102 to give him a satisfactorily accurate answer, or because he notices that some error has been made in setting the value in the keyboard. In either event the operator is provided with a lever 120 which, when moved rearwardly from its normal neutral position will cause the machine to come to a stop at the end of a cycle in which the lever is moved. The lever is usually used in this manner when for some reason the operator wishes to instantly terminate the operation. However, in the case where the operator has obtained sufficient significant figures in the quotient and desires to stop the division operation it is desirable that the machine conclude determination of the quotient figure in the order in which the machine is operating at the time the lever is moved. This is effected by moving the lever 120 forwardly which results in the divisor being subtracted until the overdraft occurs, at the conclusion of the correction the operation is stopped, thereby providing the operator with an indication in the counter 102 of true figures of the quotient to the extent determined.

Referring now to the automatic multiplier side of the machine. A ten key keyboard 121 is provided by means of which the multiplier value is set in a control mechanism which includes indicator dials 122 in which the multiplier value set by means of keyboard 121 is indicated. In connection with the automatic multiplier mechanism four operation control keys are provided. The key 123 when depressed causes a return clear operation followed by the automatic multiplication in which the multiplicand registered in the keyboard 100 is registered in the accumulator 101 and the multiplier indicated in the dials 122 is registered in the counter 102, the carriage shifting automatically to the right as multiplication by each digit is concluded. The control key 124 initiates an operation similar to the key 123 except that the accumulator 101 does not clear. This key is employed whenever it is desired to preserve the figure registered in the accumulator 101 at the outset of the multiplication operation. A key 125 initiates an operation similar to that of the key 124 except that the registration is negative instead of positive, that is, in effect the product of the multiplicand set in the keyboard 100 and the multiplier set in the dials 122 is subtracted from whatever value stands in the accumulator 101 at the beginning of the operation. In case the operator decides to change the multiplier figure appearing in the dials 122 before starting a multiplying operation either because the figure was erroneously set up by means of the keyboard 121, or for some other reason, the operator depresses the key 126 which causes the value to be cleared out of the multiplier control mechanism and to condition the mechanism for re-entry of another value by means of the keys 121.

For a complete disclosure of the automatic multiplication mechanism reference is to be had to the patent to Friden 2,371,752 and also to the patent to Friden et al. 2,399,917 and for an improved mechanism controlled by the key 126 reference is to be had to the patent 2,427,271 of Friden et al.

GENERAL CONSTRUCTION

Frame work of the machine comprises a base 130 (Fig. 7) at the right side of which is mounted a vertical frame plate 131, and at the left side is mounted a vertical frame plate 132 (Figs. 3A and 3B). Intermediate the side frames 131, 132 are front and rear bearing plates 133, 134 (Figs. 3A and 3B). These parts comprise the main frame work of the machine and are supplemented by additional sub-frames. Supported in the front part of the frame work is the keyboard 100 (Fig. 2A). In each ordinal row of keys, well-known means is provided whereby depression of a selected numeral key adjusts an associated selector gear 135 relatively to a segmental differentially stepped tooth actuator drum or gear 136 secured to an actuator shaft 137. After adjustment of the gears 135 rotation of actuator shaft 137 causes the segmental gear 136 to engage the selector gear 135 which is rotated a differential amount corresponding to the number of the key depressed. The selector gears 135 are mounted on a square shaft 138 which has a pair of bevel gears 139, 140 (Fig. 2B) thereon. The bevel gears 139, 140 are inter-connected by a sleeve 141. Transversely extending gate 142 serves to shift all of the sleeves 141 forwardly or rearwardly from their normal central position shown to engage the bevel gear 140 with the numeral wheel gear 143 or to engage the bevel gear 139 with the numeral wheel gear 143 to determine positive or negative registration in the accumulator.

Means for rotating the actuator shafts 137 comprises a transversely extending main drive shaft 145 (Figs. 3A and 3B) which is connected to the actuator shafts 137 by bevel gears 146, 147. The means for rotating the main drive shaft 145 comprises the motor 148 (Fig. 2B) connected by a train of gears 149, 150, 151 (Fig. 8) to a pawl and ratchet clutch 152 the driven side of which is secured to the main drive shaft 145. Cyclic rotation of the drive shaft is determined by operation of a clutch control lever 153 (Fig. 8) pivotally mounted on the frame 131 at 154 and connected by a link 155 to a lever 156 pivoted at 157 on the frame 131. The lever 156 has a pin and slot connection 158 to a lever 159 pivoted at 160. Lever 159 has a fiber roller 161 for closing the contacts of the motor switch 162. Accordingly, whenever the roller 161 (Fig. 8) is moved rearwardly to close the switch 162 the lever 153 is rocked to cause engagement of the clutch and the main drive shaft is rotated until the parts are released and permitted to be returned to the position shown in Figure 8 under the influence of spring 163.

Well-known means is provided for shifting the carriage 103 which comprises a pin wheel 170 (Figs. 2B and 3B) which engages a rack on the carriage and can be selectively rotated in either direction to cause right or left shift by selectively engaging jaw clutches 171, 172 respectively. The driver side of each clutch is non-rotatably but slidably mounted on an actuator shaft 137. The right shift clutch 171 is engaged by moving the push rod 173 rearwardly which has a fork 174 thereon engaging a groove in the slidable element of the clutch. A spring 175 normally urges the push rod forwardly to maintain the clutch disengaged. Similarly, the left shift clutch 172 is controlled by means of push rod 176.

A well-known means is provided for transmitting power to the clear mechanism for the accumulator and counter. This comprises a jaw clutch 177 (Fig. 3A) having an element 178 slidably but non-rotatably mounted on an actuator shaft 137 and moved by means of a push rod 180 having a fork 181 engaging a groove in the slidable element of the clutch. The push rod 180 is normally urged forwardly by a spring 182 (Fig. 11) to hold the clutch 177 open.

Power setting unit

It will be recalled, referring to Figure 1, that three of the operation control keys, i. e., return clear key 113, dividend entry key 115 and the multiplication key 123 all cause a return clear operation, that is, a shift of the carriage to the left end position where the accumulator is cleared. For that reason the construction and operation of the power setting unit will be described in connection with the return clear key 113.

Referring to Figure 7, return clear key 113 is slidably mounted on studs 183 and 184 and when depressed is held down by means of a latch 185 in a well-known manner. Disposed in an aperture 186 in the key stem is a roller 187 on a bellcrank 188 which is connected by a link 189 to a bellcrank 190 thru a pin and slot connection 191. The link 189 is normally urged rearwardly by means of a spring 192 which urges the bellcrank 188 counter-clockwise tending to raise the key.

Clockwise rotation of the bellcrank 190 causes clockwise rotation of the shaft 200 by engagement of a roller 201 on the bellcrank with the arm 202 of a lever 203 secured to the shaft 200. The clockwise rocking of the shaft 200 is utilized to close the switch to the motor and to engage the clutch. The mechanism for this is shown in Fig. 9. An arm 264 is pinned to the shaft 200. The arm 264 has a cam face 265 engaging the roller 161 mounted on the lower end of the two arm lever 159 (Fig. 8). The rocking of the shaft 200 causes the surface 265 to cam the roller 161 to close the switch 162 and to rock the clutch dog 153, thereby permitting the clutch to become engaged.

The mechanism for lightening the key touch on the operation control keys is also associated with shaft 200, and is shown particularly in Figs. 5 and 6. It will be recalled that depression of the return clear key 113, as is true of the other control keys involved herein, rocks the shaft 200, clockwise in Figs. 6 and 7 and counter-clockwise in Fig. 5. A bellcrank 400 is pinned to the shaft 200, in a plane adjacent the left shift clutch push rod 176 (Fig. 3B). The bellcrank 400 has a lower arm 401 which is provided with a stud 402 for the purposes hereinafter mentioned, and an upper arm 403 which is provided with a stud 404. The stud 404 is embraced in a slot 405 in one end of link 406, a spring 407 connecting stud 404 to the turned-over ear 408 on the adjacent end of the link 406. The other end of link 406 is pinned to an arm 410 of a hook member 411, by any suitable means such as rivet 412. The hook member 411 is rotatably mounted on an eccentric 413 pinned to the shaft 259. The hook member is provided with a second arm 414, the outer end of which is provided with a hook 415.

The shaft 259, just mentioned, is connected at its left end (Fig. 3A), by means of bevel gears 260 to a shaft 261 which in turn is connected by bevel gears 262 (Fig. 12), to main drive shaft 145. By this means the shaft 259 is rotated in synchronism with the main drive shaft. It is thus obvious that the hook member 411 continuously rocks on its eccentric mounting in synchronism with the main drive shaft whenever the main clutch 152 is engaged and the motor is running.

A bellcrank 420 is pinned to a shaft 250 in a plane immediately adjacent to that of the hook 415. The upper arm 421 of the bellcrank is provided with a stud 422 which, when the hook member 411 is rocked clockwise through rocking of the shaft 200, will be engaged by the hook 415 during its continuous reciprocation. However, when the shaft 200 is in its normal setting, the counter-clockwise position shown in Fig. 6, the reciprocating hook 415 cannot engage the stud 422. When the hook 415 is rocked to its operative position (clockwise of that shown in Fig. 6) the hook, at its extreme leftward travel will engage the stud 422 and thereupon will rock the bellcrank 420 and the shaft 250 clockwise. It will be understood that the hook 415 is effective to pull bellcrank 420 and shaft 250 clockwise only after the member 411 has been rocked clockwise on its eccentric, for otherwise the hook will not travel in a path which will bring it into engagement with stud 422.

The lower arm 423 of the bellcrank 420 is provided with a latching stud 424. Associated with the latching stud 424 is a latching member 425 pivotally mounted on a pin 252 supported by the bracket member 426. The latch 425 is pulled counterclockwise by a spring 427 tensioned between it and the bracket 426. The latch has a shoulder 428 adapted to engage the pin 424 on the arm 423, thereby latching the bellcrank 420 and shaft 250 in the operative (clockwise in Fig. 6) position, thus locking the shaft in its clutch-engaging position. The latch member 425 is also provided with extension 429 which is engaged by the pin 402 on the bellcrank 400 when the bellcrank and its shaft 200 are rocked in a counter-clockwise direction (in Fig. 6), thereby unlatching the latch 425 and releasing the shaft 250 for counter-clockwise rotation. As the bellcrank 420 is locked in its rocked position by the latch 425, the rocking of the eccentrically-mounted hook 411 is effective to pull it to its extreme latched position and thereafter oscillates idly.

It will be recalled that depression of the return clear key 113 (Fig. 7) causes rotation of the shaft 200 which resulted in the shaft 250 being rocked to its operative position. Rocking of the shaft 250 causes engagement of the left shift clutch and the clear clutch as will now be explained. Referring to Fig. 10 the shaft 250 has an arm 266 secured thereto, on which a pusher arm 268 is pivoted by an suitable means, such as pin 267. The pusher arm 268 has a shoulder 269 engaging a pin 270 on an arm 271 which is secured to sleeve 272 rotatably mounted on a shaft 273 (see also Fig. 3B). Sleeve 272 also carries an arm 274 having a pin 275 thereon which engages the left shift push rod 176 (Figs. 2A and 3B). This, it will be recalled, causes engagement of the left shift clutch 172 and causes the carriage to be shifted to the left.

The clear clutch is engaged as follows: Referring to Fig. 11 shaft 250 has secured thereto an arm 280, which arm carries a pusher arm 281 pivotally mounted thereon at 282. The pusher arm 281 engages a push rod 180 so that rocking of the shaft 250 also causes engagement of the clear clutch 177 (Fig. 3A).

After the conclusion of the return clear operation, a well-known mechanism causes operation of the latch 185 (Fig. 7) to release the return clear key 113. This results in a return of the link 189 under the influence of its spring 192 to its original position. Such movement of link 189 permits return of the bellcrank 190 under the influence of its spring 283 to its original position, thus, permitting the shaft 200 to rock counterclockwise (Fig. 7) under the influence of spring 284 (Fig. 14) attached to an arm 285 secured thereto. Counter-clockwise rotation of the shaft 200 causes unlatching of the arm 425 by reason of engagement of the pin 402 on the arm 401 with the latch 425, for as the shaft 200 and its bellcrank 400 move counter-clockwise (Fig. 6) the pin 402 lifts the latch 425 off the pin 424 of the arm 423. The lifting of the latch 425 permits the bellcrank 420 to rock counter-clockwise, and, as it is pinned to shaft 250, the shaft 250 is likewise rocked counter-clockwise. The counter-clockwise rocking of shaft 250 disengages the left shift clutch and the clear clutch push rods heretofore described. The release of left shift clutch push rod 176 (Fig. 3B) and clear clutch push rod 180 (Fig. 3A) cause disengagement of their respective clutches under the influence of their springs. Simultaneously, the release of shaft 200 and its counter-clockwise rotation, permits spring 163 to cause disengagement of the clutch 152 and the opening of switch 162. Shaft 250 is then restored to its original position by spring 286 (Fig. 3B) and the parts of the power-setting unit all reoccupy the original position shown in Figs. 5 and 6.

Dividend entry

Dividend entry key 115 (Fig. 7) when depressed is held down by means of a well-known latch 290, and thru a pin and slot connection 291 rocks the bellcrank 190 which, as previously explained, rocks the shaft 200 to release the power setting unit thereby resulting in a return clear operation. As disclosed in the patent to Machado 2,363,737, the dividend entry key 115 also conditions mechanism to cause a right shift from the left end position to the tabulated position determined by the selected tabulator key 116 (Fig. 1) where a cam 292 (Fig. 7) is unlatched and is rotated counter-clockwise by a spring 293. The cam 292 engages a roller 294 on a lever 295 secured to a shaft 296 (Figs. 2B, 7) which operates the gate 142 previously described to cause entry of the dividend. The lever 295 (Fig. 7) has an upper arm 297 which engages a pin 298 to withdraw the latch 290 and release the key 115 which returns under the influence of its spring 299. Upon return of the key 115 the shaft 200 restores, as previously described, and the parts of the power setting unit return to their original positions shown in Figures 5 and 6.

Multiplier keys

As previously explained, the multiplier key 123 (Fig.

1) causes a return clear operation as a preliminary to initiating a multiplication. Key 123 (Fig. 11) has a pin and slot connection 300 with a lever 301 pivoted to the frame at 302. A roller 303 on the lever 301 engages an arm 304 secured to the shaft 200. Accordingly, depression of the key 123 causes rotation of the shaft 200 and, as previously described, the power setting unit causes a return clear operation. As disclosed in the above cited patent to Friden et al. 2,399,917, mechanism is provided which comes into operation at the conclusion of the clear cycle or at the end of a shift of the carriage to the left end position when no clear cycle is to be performed, and causes rotation of the shaft 305 (Fig. 11). This shaft has an arm 306 secured thereto having an ear 307 underlying a rearwardly extending arm of a bellcrank 308 rotatably mounted on the shaft 250. The other arm of the bellcrank 308 has a pin 309 which normally is in engagement with a slot 310 of an arm 311 pivoted at 312 on arm 131 secured to the shaft 314. Shaft 314 (Fig. 14) has secured thereto a latch 315 which, when rotated, releases a pin 316 on an arm 317 which, as described in the aforesaid patent, is then free to rock clockwise and initiate the multiplication operation.

As previously explained, the multiplier keys 124, 125 do not cause clearing of the accumulator upon return of the carriage to the left end position. Accordingly, while means are provided to cause operation of the power setting unit, additional means is provided under control of these keys to override control of the clear mechanism to prevent its operation as will now be explained. As explained in the patent to Friden et al. 2,399,917, depression of either key 124 or key 125 (Fig. 14) causes rocking of lever 318. In accordance with this invention lever 318 is provided with a depending portion 319 which engages the pin 320 on a lever 285 secured to shaft 200 so that depression of either key will rock shaft 200 and cause operation of the power setting unit. The arm 318 has a pin 321 engaging the forked end of a link 322 secured to an arm 323 fastened to a shaft 324. Referring to Figure 11, shaft 324 also has secured thereto arm 325 provided with a pin 326 so that upon depression of either key shaft 324 is rocked counter-clockwise in Figure 14, clockwise in Figure 11 whereupon the pin 326 engages an arm 327 of the pusher arm 281 rocking it counter-clockwise on its pivot 282 to remove it from engagement with the clear clutch push rod 180 so that while the shaft 250 may be rocked, the push rod 180 will not be operated due to the fact that its control has been removed from the pusher arm 281.

When any one of the keys 123, 124 and 125 is depressed, it is latched down during the ensuing multiplying operation and is automatically released at the end of the operation by known mechanism of the kind disclosed in the aforesaid Friden Patent 2,399,917.

The multiplier correction key 126 (Fig. 11) has a pin and slot connection 328 with a bellcrank 329 pivoted at 330. The depending arm of the bellcrank has pin 331 thereon which underlies the end of the arm 311 and which lifts the notch 310 out of engagement with the pin 309 when the multiplier correction key is depressed. This prevents initiation of a multiplying operation at the conclusion of the clear cycle at which time the shaft 305 is rotated, as previously described. The pin 331 in lifting the rear end of the arm 311 brings it into engagement with a pin 332 (see also Fig. 12) on a fork 333 which, when rocked clockwise, lifts the return feed pawl 334 into operative engagement with the rack 335 on the multiplier pin carriage 336. When the key 126 is depressed and the bellcrank 329 is rocked counter-clockwise the shaft 200 is rocked by reason of a link 337 which interconnects the bellcrank and the arm 304. This, as previously described, causes operation of the power setting unit and consequently a return clear operation is initiated. However, it is undesirable to cause clearance of the values in the accumulator in this operation so the link 337 (Fig. 11) is provided with a pin 338 which engages the arm 327 of the pusher arm 281 in order to move it to inoperative position. When the shaft 200 is rocked to initiate the operation, the main drive shaft 145 (Fig. 12) is started rotating, and thru the bevel gear connection 262 rotates the shaft 261 which, it will be recalled, has a bevel gear connection 260 to the shaft 259. Secured to the shaft 259 is a cam 339 which is so disposed that when the pin carriage 336 has been returned to its farthest right position the cam 339 is in cooperative relation with an ear 340 on a lever 341 having a pin 342 therein which extends laterally across the indicator dials 122, and as shown in Figure 13 acts as a bail to restore all of the dials to zero where they become latched by the latches 343 (Fig. 12).

*Disabling keyboard clear*

It is desirable when the multiplier correction key 126 is depressed that the value set in the keyboard 100 be retained therein regardless of the adjustment of the add key 110. For this reason the lever 329 (Fig. 11) has a shoulder 350 overlying the end of a lever 351 secured to a shaft 352 which extends laterally across the front of the machine to the right side where it appears in Figure 8.

The normal operation of the automatic keyboard clear mechanism under the control of the add key 110 will now be described. Referring to Figure 9, when the key 110 is depressed it, by means of a pin and slot connection 353 with a long link 354, lowers the front end of the link 354 which, under control of a cam face 355 thereon with a stud 356 in the frame, is moved forwardly and downwardly. The downward movement results in engaging a notch 357 in the link 354 with a pin 358, the purpose of which will be presently described. When the link 354 moves forwardly it rocks the foot of a lever 359 pivoted at 360 into the path of a pin 361 secured to a member 362 on the main drive shaft 145 so that as the drive shaft 145 rotates counter-clockwise (Fig. 9) the pin 361 rocks the lever 359 near the end of the cycle and this causes the link 354 to draw the pin 358 rearwardly. Referring now to Figure 8, pin 358 is secured to a bellcrank 363 pivoted at 364 to the side frame 131. Pivotally mounted at 365 on the bellcrank 363 is an arm 366 which has a lip 367 on its front edge which is adapted to engage an extension 368 on the bail 369 (Fig. 2A) which operates the latch slides 370 to release the keys of the keyboard. If the arm 366 is rocked counter-clockwise, in Figure 8, on its pivot, the lip 367 will pass beneath the extension 368 and fail to clear the keyboard. The function of the shaft 352 which is rocked clockwise in Figure 8 upon depression of the multiplier correction key can now be explained. Secured to the right end of the shaft 352 is a bellcrank 371 having a fork 372 engaging lug 373 on a lever 374 pivoted at 375. The lever 374 has an ear 376 which engages the lip 367 of the arm 366 to rock the arm 366 counter-clockwise when the shaft 352 is rotated clockwise which causes the lip to reciprocate underneath the extension 368 if the add key 110 is in its depressed position where it has connected the link 354 to the pin 358 (Fig. 9). In addition, when the add key 110 is depressed the latch 377 is permitted to become operative under the influence of its spring 378 so that when the shaft 352 and the bellcrank 371 are rotated clockwise upon depression of the multiplier correction key, the shoulder 379 on the latch 377 will engage a pin 380 on the bellcrank 371 to hold the arm 366 in its inoperative position. On the arm 366 is a square pin 381 which engages the hooked end 382 of the latch 377 and unlatches it at the end of the rearward stroke of the arm 366 so that in effect, when the latch 377 is operative it is delatched at the end of every stroke of the arm 366. In all cycles except the last cycle of a multiplier correction operation, the lip 367 has passed under the extension 368 by the time the square pin 381 encounters the hooked end 382 of the latch 377. Therefore the lip 367 is prevented from operating the keyboard clearing bail 368—369 even through the fork 372 is temporarily unlatched cyclically. During the last cycle of a multiplier correction operation, the multiplier correction key 126 is released prior to the operation of the link 354 by the pin 361 and lever 359. During this cycle, after the key 126 has been released, the latch 377 effectively holds the fork 372 in position for maintaining the link 366 inoperative with respect to the keyboard clearing bail 368—369, thus preventing the last cycle operation of the link 354 from clearing the keyboard.

In the operation of the multiplier keys 123, 124, 125, the return clear key 113 and the dividend entry key 115, the automatic keyboard clear mechanism is disabled during the operation but is enabled in the last cycle of the operation. This is effected by the following mechanism. The shaft 250 (Fig. 9) has secured thereto an arm 383 connected by a link 384 to an arm 385 (Fig. 7) pivoted on the side frame 131 at 386 and having a link 387 pivoted thereto at 388, the other end of the link being pivoted at 389 to an arm 390 rotatably mounted on the shaft 391. The upstanding end 392 of the link 387 has a pin 393 which is shown in section in Figure 8. Therefore, when any of the operation keys referred to which bring the power setting unit into operation are depressed the shaft 250 is rocked, resulting in elevation of the pin 393 (Fig. 8) thereby rocking the arm 366 to its inoperative position so that during the time any of these keys are latched down the keyboard clearing mechanism is inoperative until they are unlatched, which occurs in the last cycle of the operation when the keyboard clear mechanism becomes operative.

*Division stop*

As previously described, the lever 120 (Fig. 1) can be moved either rearwardly to instantly stop the machine in the current cycle, or forwardly to conclude a division operation after a true quotient figure has been determined.

Referring now to Figures 8 and 9 and to the previously cited patent to Friden 2,229,890 for details of the automatic division mechanism. When the division keys 114 (Fig. 1) are depressed the division operation control member 394 (Fig. 8) is rocked counter-clockwise on its pivot. As explained in said patent, the forked end of the lever 394 engages a pin on a gate-adjusting slide and moves the latter to adjust the gate 142 (Fig. 2B) to the subtract position. When an overdraft occurs means are provided which move the lever 394 rearwardly to adjust the gate to the add position, and at the conclusion of the corrective addition cycle the lever 394 is moved forwardly to adjust the gate to neutral during the shift cycle. A latch 395 is adapted to engage a semicircular pin 396 in the lever 394 when it is rocked counter-clockwise upon depression of the division key 114. Latch 395 is urged clockwise on its pivot by a spring 397 and has an ear 398 which cooperates with a nose 399 on the lever 120 which is pivoted at 400. When the operator moves the lever 120 rearwardly to stop the division operation, the lower cam face of the nose 399 engages the ear 398 to rotate the latch 395 thereby releasing the pin 396. However, when it is desired to terminate the division operation with the true quotient figure the lever 120 is moved forwardly or counter-clockwise on its pivot 400. An arm 402 is connected to the lever 120 by a spring 403 which urges the arm 402 counter-clockwise on its pivot. The counter-clockwise rotation is limited by an ear 404 on the arm 402 engaging the lower edge of lever 120. When the lever 120 is moved counter-clockwise a shoulder 405 on the arm 402 engages the underside of the ear 398 on the latch 395 and the spring 403 is tensioned. At the end of the cycle in which the overdraft occurs the arm 394 is moved rearwardly so that the pin 396 causes the latch 395 to rotate counter-clockwise. When the ear 398 frees the shoulder 405 the arm 402 is rotated counter-clockwise by its spring 403 until a second shoulder 406 engages the ear 398. At the end of the cycle of corrective addition the lever 394 moves forwardly and the pin 396 moves off the latch 395 which is held out by the arm 402 so that the arm 394 may return to its original position thereby stopping the division operation after the corrective addition with the true quotient figure in the counter.

In the well known standard Friden commercial machine, means controlled by the division key is provided for rocking the lever 424 counter-clockwise (Fig. 8) to disable the keyboard clearing mechanism during all but the last cycle of a division operation. During the last cycle the keyboard clearing mechanism is re-enabled and the keyboard is cleared.

In both division stop operations it is desirable not to clear the keyboard because the operator may wish to employ the divisor set therein to continue the division operation. Accordingly, the lever 120 is provided with a pin 410 which extends thru a slot in the side frame 131 and engages in the forked end of a lever 411 (Fig. 9) pivoted at 412. The lever 411 has an ear 413 which engages a lug 414 on an arm 415 which has a finger 416 overlying the end of a lever 417 pivoted at 418. When the lever 120 (Fig. 9) is moved rearwardly the pin 410 rocks the lever 411 counterclockwise, the arm 415 clockwise and the lever 417 counter-clockwise. The parts are held in this position by a latch 420 which has a shoulder 421 that engages an ear 422 on the arm 415. The lever 417 has a pin 423 which extends laterally thru a hole in the side frame 131 as seen in Figure 8. As there viewed, when the lever 120 is moved to its rearward position the pin 423 moves upwardly, in so doing it rocks the lever 424 counter-clockwise on its pivot 364 and the lever 424 has a pin 425 which rocks a lever 426 clockwise. The lever 426 engages a pin 427 on the lever 366 which is rocked counter-clockwise on its pivot 365 thus lowering the lip 367 below the extension 368 so that if the add key is depressed the lip 367 will move rearwardly beneath the extension 368 as the link 354 (Fig. 9) moves rearwardly. At the end of its rearward stroke the rear end of the link 354 engages an ear 428 formed on an arm of the latch 420 and rotates the latch counter-clockwise on its pivot 412 thereby releasing the arm 415.

Even if, during the performance of a cycle in a division operation, the division stop lever 120 should be moved rearwardly and then allowed to return quickly before the completion of the current cycle, that is, before the pin 361 on the rotary member 362 encounters the lower end of the lever 359, the keyboard nevertheless, will not be cleared. This is because the latch 420, having been set in latching position by the rearward movement of the stop lever 120, will maintain the keyboard clearing mechanism disabled until the end of the last cycle. When the pin 361 rocks the lever 359 at the end of the last cycle, causing releasing of the latch 420, as previously explained, the lip 367 on the arm 366 will already have passed idly under the extension 368 on the keyboard clearing bail 369. Consequently, the rocking of the lever 359 in the last cycle which releases the latch 420 to render the keyboard clear disabling means ineffective will not cause operation of the keyboard clear mechanism.

When the lever 120 is moved forwardly it is held in its forward position by the detent 401 (Fig. 8). Forward movement of the lever 120 (Fig. 9) causes counter-clockwise rotation of the lever 411 and sets all of the parts, as previously described, with the exception of the latch 420 which is held disabled by engagement of the pin 410 with a lug 429 on the latch 420.

I claim:

1. In a calculating machine capable of performing division operations automatically by the method of successive subtractions, overdraft and corrective addition, a control member, a latch therefor, said member being moved to latched position when a division operation is initiated, said member remaining latched during the division operation, unlatching of said member terminating the operation, while latched said member moving from one position to another to control the subtraction and additive registrations, a lever manually movable in one of two directions to selectively terminate a division operation either in the current cycle or as soon as a true quotient figure has been registered, said lever having a face engageable with said latch when said lever is moved in one direction for moving said latch to release said member, said lever having a pawl thereon rendered operative with respect to said latch when said lever is moved in the other direction, said pawl moving into blocking relation with respect to said latch when said member and latch move to the additive control position so that upon return of said member from the additive position after determination of the true quotient figure said latch is blocked against movement by said pawl and said member is released from said latch.

2. In a calculating machine capable of performing automatic division and having a keyboard in which the divisor is set and latched, a division operation control member movable from ineffective position to operative position for effecting and controlling the performance of a division operation, an automatically operable keyboard clear means, normally ineffective disabling means adapted when rendered effective to disable said keyboard clear means, division stop mechanism including a lever manually movable in one direction or the opposite to effect returning of said division operation control member to ineffective position to selectively terminate the division operation either in the current cycle or as soon as a true quotient figure has been registered, and means actuated by movement of said lever in either direction for rendering said disabling means effective.

3. In a calculating machine capable of performing division operations automatically by the method of successive subtractions, overdraft and corrective addition, a control member, a latch therefor, said member being moved to latched position when a division operation is initiated, said member remaining latched during the division operation, unlatching of said member terminating the operation, while latched said member moving from one position to another to control the subtraction and additive registrations, a lever manually movable in one of two directions to selectively terminate a division operation either in the current cycle or as soon as a true quotient figure has been registered, said lever being formed with a cam face and said latch having an ear engageable by said cam face when said lever is moved in one direction for moving said latch to release said member, said lever having a pawl thereon rendered operative with respect to said latch when said lever is moved in the other direction, said pawl moving into blocking relation with respect to said latch when said member and latch move to the additive control position so that upon return of said member from the additive position after determination of the true quotient figure said latch is blocked against movement by said pawl and said member is released from said latch.

4. In a calculating machine capable of performing division operations automatically and having a keyboard in which the divisor is set and latched, a division operation control member movable from ineffective position to operative position for effecting and controlling the performance of a division operation, an automatically operable keyboard clear means, a lever manually operable to effect returning of said division operation control member to ineffective position to terminate a division operation, means actuated by said lever for disabling said keyboard clear means, and means responsive to return movement of said lever for re-enabling said keyboard clear means.

5. In a calculating machine capable of performing automatic division and having a keyboard in which the divisor is set and latched, a division operation control member movable from ineffective position to operative position for effecting and controlling the performance of a division operation, an automatically operable keyboard clear means, a lever manually movable from a neutral position in one direction or the opposite to effect returning of said division operation control member to ineffective position to selectively terminate the division operation either in the current cycle or as soon as a true quotient figure has been registered, means actuated by movement of said lever in either direction for disabling said keyboard clear means, and means responsive to return movement of said lever to neutral position for re-enabling said keyboard clear means.

6. In a calculating machine capable of performing automatic division and having a keyboard in which the divisor is set and latched, a division operation control member movable from ineffective position to operative position for effecting and controlling the performance of a division operation, an automatically operable keyboard clear means, a lever manually movable from a neutral position in one direction or the opposite to effect returning of said division operation control member to ineffective position to selectively terminate the division operation either in the current cycle or as soon as a true quotient figure has been registered, means including an element movable in a predetermined direction for disabling said keyboard clear means, and an operating connection between said lever and said element for moving the latter in said predetermined direction in response to movement of said lever in either direction from its said neutral position.

7. In a calculating machine capable of performing division operations automatically and having a keyboard in which the divisor is set and latched, keyboard clear means, cyclically operable mechanism for operating said keyboard clear means automatically following the next-to-last cycle of a division operation, a lever manually operable to terminate a division operation, and disabling means actuatable by said lever for preventing said mechanism from operating said keyboard clear means, a latch for releasably holding said disabling means in actuated position, and means operated by said mechanism for releasing said latch.

8. In a calculating machine capable of performing division operations automatically and having a keyboard in which the divisor is set and latched, a division operation control member movable from ineffective position to operative position for effecting and controlling the performance of a division operation, an automatically operable keyboard clear means, normally ineffective disabling means adapted when rendered effective to disable said keyboard clear means, a lever manually operable to effect returning of said division operation control member to ineffective position for terminating a division operation, and mean actuatable in response to such operation of said lever for rendering said disabling means effective, said disabling means being adapted to be rendered effective exclusively under the control of said lever.

9. In a calculating machine capable of performing automatic division and having a keyboard in which the divisor is set and latched, a division operation control member movable from ineffective position to operative position for effecting and controlling the performance of a division operation, keyboard clear means normally operable automatically following the next-to-last cycle of a division operation, a lever manually movable in one direction or the opposite to effect returning of said division operation control member to ineffective position to selectively terminate the division operation either in the current cycle or as soon as a true quotient figure has been registered, and means rendered effective by movement of said lever in either direction for disabling said keyboard clear means, a latch for releasably holding said disabling means in actuated position when said lever has been moved in the direction to terminate the division operation in the current cycle, means on said keyboard clear means for releasing said latch upon operation of said clear means, means on said lever for disabling said latch when said lever is moved to the true quotient position, and a detent for holding said lever in said true quotient position.

10. In a calculating machine having a division mechanism for performing automatic division, a keyboard in which the divisor is set and latched, a keyboard clearing means, an "add" key mechanism including automatic means operable to operate said keyboard clearing means with each cycle of machine operation, means associated with said division mechanism for disabling said "add" key mechanism in all but the last cycle of a division operation, a manually positionable member operative to terminate a division operation, and means associated with said member to disable the said automatic means at the conclusion of a cycle of operation when the "add" key has been moved to cause automatic clearing of said keyboard.

11. In a calculating machine having a division mechanism for performing automatic division, a keyboard in which the divisor is set, a keyboard clearing means, a manipulatable member for causing operation of said keyboard clearing means in a single cycle of operation, means operable during a division operation to disable said keyboard clearing means in all but the last cycle of the operation, and a member positionable to terminate a division operation including means associated with said member to disable the said keyboard clearing means at the conclusion of a cycle of operation when the manipulatable member has been selectively positioned to cause automatic clearing of said keyboard.

12. In a calculating machine having a division mechanism for performing automatic division, a selection mechanism in which the divisor is set, a latching means for the said selection mechanism, latch releasing means, a single cycle mechanism including automatic means operable to operate said latch releasing means with each cycle of machine operation, means associated with said division mechanism for disabling said automatic means in all but the last cycle of a division operation, a manipulatable member operative to terminate a division operation, and means associated with said member to disable the said automatic means when the single cycle mechanism is operative to cause automatic releasing of said selection mechanism.

13. In a calculating machine having a plural order selection mechanism in which a factor can be entered, an ordinal latching means for each order of said selection mechanism, a common unlatching member operative to release said ordinal latching means, an automatic clearing mechanism including a manipulative key and a connecting mechanism normally controlled thereby and operable, when the said key is set in operative position, to operate said unlatching member with each cycle of machine operation, control means for initiating a multicycle operation, and means operated by said control means for disabling said common unlatching member: a manually positionable member for selectively terminating such multicycle operation and operable to disable the said connecting means when the manipulatable key is positioned to enable said unlatching member.

References Cited in the file of this patent

UNITED STATES PATENTS

| | | |
|---|---|---|
| 2,160,361 | Hilder | May 30, 1939 |
| 2,302,932 | Avery | Nov. 24, 1942 |
| 2,327,981 | Friden | Aug. 31, 1943 |
| 2,350,979 | Avery et al. | June 13, 1944 |
| 2,346,834 | Friden et al. | Apr. 18, 1944 |
| 2,390,041 | Avery et al. | Dec. 4, 1945 |
| 2,403,273 | Friden et al. | July 2, 1946 |
| 2,447,108 | Avery | Aug. 17, 1948 |